(12) United States Patent
Aoyama et al.

(10) Patent No.: US 6,260,836 B1
(45) Date of Patent: Jul. 17, 2001

(54) SUSPENSION SYSTEM FOR VEHICLE

(75) Inventors: Toshiho Aoyama, Nagoya; Takashi Goto, Chiryu, both of (JP)

(73) Assignee: Chuohatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/179,206

(22) Filed: Oct. 27, 1998

(30) Foreign Application Priority Data

Oct. 31, 1997 (JP) .................................................. 9-316572

(51) Int. Cl.[7] .................................................. B60G 15/06
(52) U.S. Cl. ........................ 267/221; 267/220; 267/179; 280/124.155
(58) Field of Search .................................. 267/221, 220, 267/179; 280/124.147, 124.155; 185/321.11

(56) References Cited

U.S. PATENT DOCUMENTS

| 2,290,923 | * | 7/1942 | Wahlberg | 280/96.2 |
|---|---|---|---|---|
| 3,273,875 | * | 9/1966 | Dumpis | 267/8 |
| 3,573,880 | * | 4/1971 | Sakai | 280/96.2 |
| 3,781,033 | * | 12/1973 | Buchwald | 280/124 R |
| 4,084,837 | * | 4/1978 | Milner | 280/668 |
| 4,274,655 | * | 6/1981 | Lederman | 280/688 |
| 4,465,296 | * | 8/1984 | Shiratori et al. | 280/668 |
| 4,774,876 | * | 10/1988 | Lageder et al. | 92/130 A |
| 4,779,855 | * | 10/1988 | Tanaka | 267/220 |
| 4,903,985 | * | 2/1990 | Muhr et al. | 280/724 |
| 5,249,781 | * | 10/1993 | Wohler | 267/33 |

FOREIGN PATENT DOCUMENTS

2050557 * 1/1981 (GB) .

* cited by examiner

*Primary Examiner*—Robert J. Oberleitner
*Assistant Examiner*—Bradley King
(74) *Attorney, Agent, or Firm*—Lackenbach Siegel Marzullo Aronson & Greenspan

(57) ABSTRACT

The invention relates to a shock absorber loaded therearound with a compression coil spring so improved that a side force generated by the compression coil spring can be effectively alleviated by making both or any one of an upper sheet 13 mounted to an absorber rod 3 and a lower sheet 16 mounted on an absorber tube 2 so as to be loaded therebetween with the compression coil spring 17 free to rock relatively to each other in a predetermined direction or in any direction.

6 Claims, 6 Drawing Sheets

SUSPENSION SYSTEM FOR VEHICLE

BACKGROUND OF THE INVENTION

1. Field of the Invention

This invention relates to a suspension system for vehicle in the form of a shock absorber loaded therearound with a compression coil spring and more particularly to such suspension system for a vehicle adapted to alleviate a force generated by the compression coil spring and directed perpendicularly to a coil axis (referred to hereinafter as "side forces").

2. Description of the Prior Art

Recently, high strength spring steel has been put to practical use and various improved working techniques such as special shot peening in order to obtain a light weight and compact product. Such efforts have increased design stress as well as pitch angle of a suspension coil spring. However, such improvement has often been accompanied with an apprehension that, even when the spring seat is displaced only in the coil axis (so-called parallel compression), a side force might be generated. Particularly when the shock absorber is loaded with such compression coil spring, such side force may often cause an absorber rod and an absorber tube to be jammed together and eventually may result not only in uncomfortable drive conditions, but also premature deterioration of the shock absorber.

To avoid such problems, various efforts have been made to alleviate the side force, for example, upper and/or lower sheets have been inclined or offcentered on the basis of a value obtained from various experiments or analytical research according to the finite element method.

SUMMARY OF THE INVENTION

This invention aims to solve the problem as both said experiments and said analytical research used to determine slants or eccentricities of the upper and lower sheets take to much time and do not necessarily give accurate values.

The invention is achieved by a suspension system for a vehicle which comprises a compression coil spring and a shock absorber, characterized by upper and lower sheet mounted on an absorber rod and on an absorber tube so as to be loaded with said compression coil spring disposed therebetween and being adapted for relatively rocking in a predetermined direction. With such arrangement, in response to a side force generated in the compression coil spring, both or any one of the upper and lower sheets tilt(s) in a predetermined direction or in any direction and consequently the compression coil spring can be smoothly curved and thereby avoid the absorber rod and the absorber tube being jammed together. If this manner, an adverse affection of the side force can be alleviated without demand for experiment as well as analysis to determine slant angles or eccentricities of the upper and lower sheets. The invention is further designed and arranged so that any one of said upper sheet and said lower sheet are or is adapted for relatively rocking around one axis of two axes which are substantially orthogonal to each other in order that the invention can be realiably realized. The invention is further arranged in that said one axis of two axes is or are defined by rollers, balls or substantially V-sectioned recesses and substantially V-sectioned projections. The invention is further arranged such that an angle by which said upper sheet and said lower sheet can rock relatively to each other is limited to a value less than a predetermined value. Appropriate experiments and analytical research according to the finite element method indicate that such arrangement is effective to avoid a side force which might abruptly increase when an excessively large load is applied to the compression coil spring.

DESCRIPTION OF THE PREFERRED EMBODIMENTS

Details of the invention will be more fully understood from the following description given hereunder in reference with the accompanying drawings.

Figure 1:
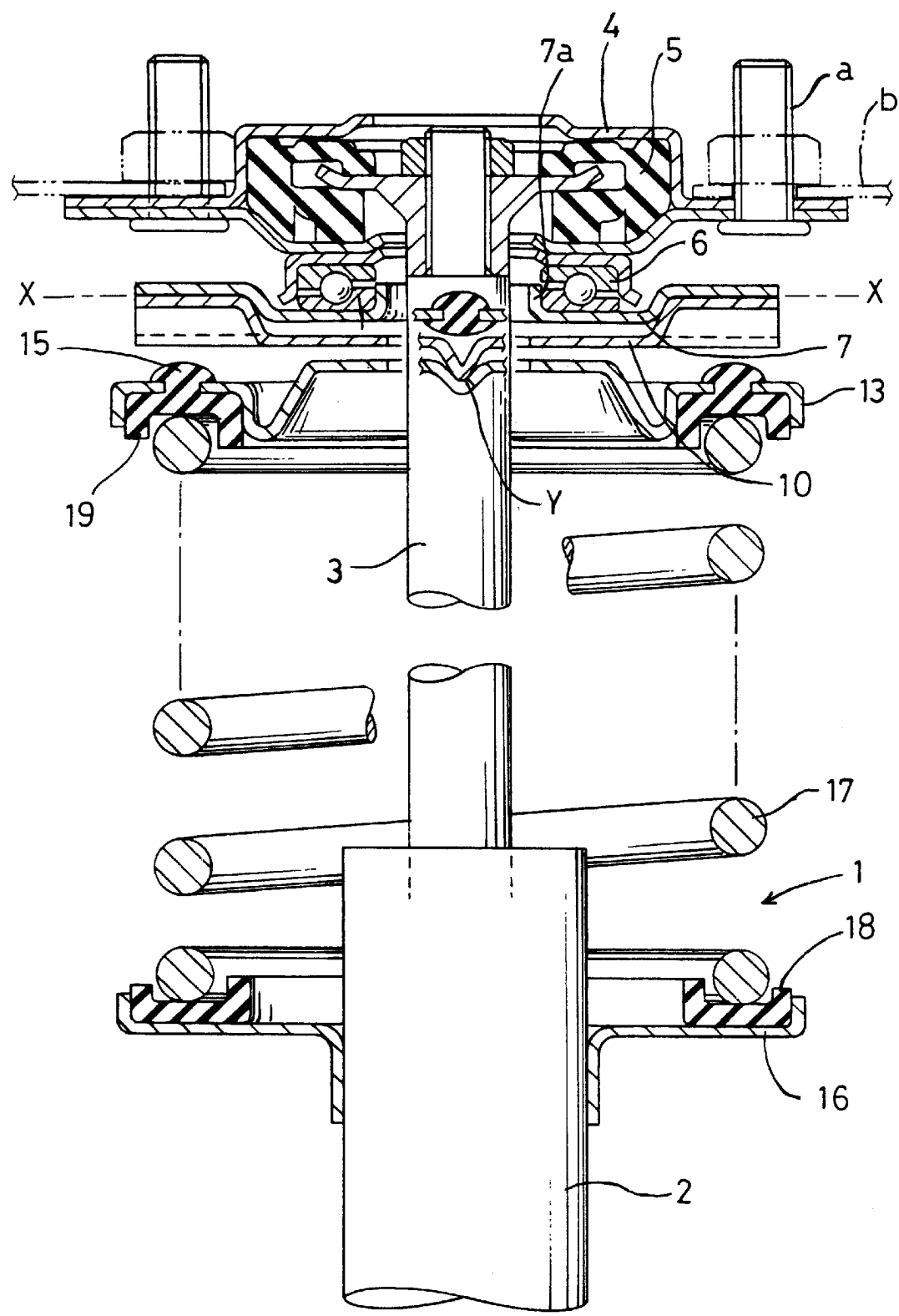
FIG. 1 is an axially sectional view showing a first embodiment of the invention.
Figure 2:
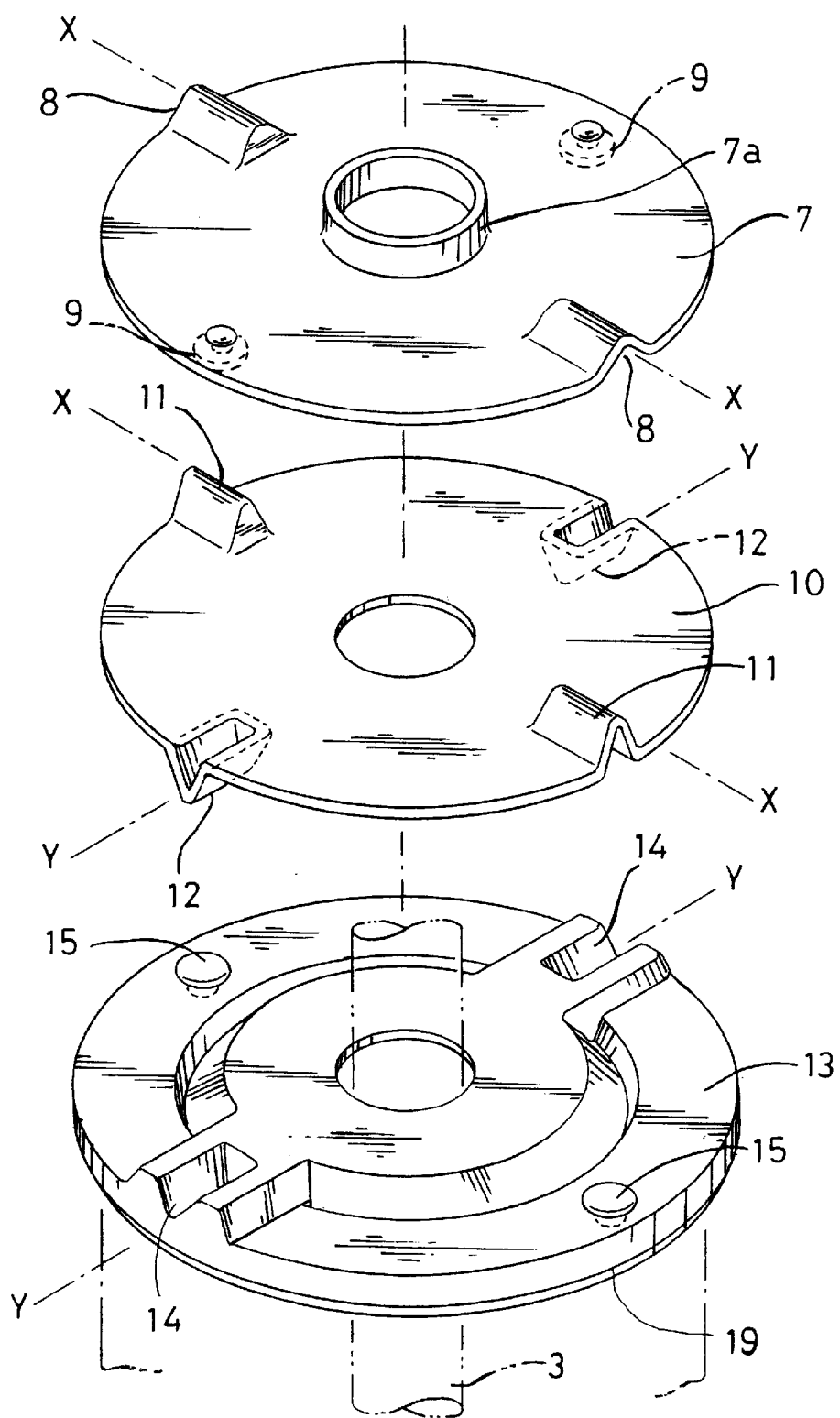
FIG. 2 is an exploded perspective view showing important parts thereof.

FIGS. 1 and 2 show a first embodiment of the invention, in which a shock absorber is designated generally by reference numeral 1. The shock absorber 1 comprises an absorber tube 2 mounted on a lower arm (not shown), an absorber rod 3 extending upward from said absorber tube 2, a cushion rubber 5, and a fixture 4 to which said absorber rod 3 is fixed with interposition of said cushion rubber 5. Said fixture 4 is secured to a car body b by bolts a.

With interposition of a thrust bearing 6, a base plate 7 underlies a lower surface of the fixture 4, and there are arranged an intermediate plate 10 and an upper sheet 13 in this order below said base plate 7. A compression coil spring 17 is provided between a lower sheet 16 fixed on the absorber tube 2 and said upper sheet 13 with interposition of lower and upper insulators 18, 19, respectively.

Referring to FIG. 2, the base plate 7 is formed at its diametrically opposite peripheral zones, i.e., at its opposite peripheral zones on an axis X—X passing a center of this plate 7 with inverted V-shaped recesses 8, 8 each opened downward at an obtuse angle. The base plate 7 is provided an its lower surface in the vicinity of its periphery with a pair of rubber stoppers 9, 9 which are also diametrically opposite but on an axis being orthogonal to said axis X—X. The base plate 7 has its central boss 7a fitted into the thrust bearing 6 so that said base plate 7 is rotatable only around the absorber rod 3.

The intermediate plate 10 is formed at its diametrically opposite peripheral zones, i.e., on an axis X—X passing a center of this plate 10 with inverted V-shaped projections 11, 11 each pointed upward at an acute angle. These projections 11 are adapted to be received by said recesses 8, 8, respectively, so that the intermediate plate 10 is able to rock around the axis X—X by an angle limited by said stoppers 9, 9. The intermediate plate 10 is further provided at its diametrically opposite peripheral zones, i.e., at its opposite peripheral zones on an axis Y—Y being orthogonal to said axis X—X with inverted V-shaped projections 12, 12 each pointed downward at an acute angle.

The upper sheet 13 is formed at its diametrically opposite peripheral zones, i.e., at its opposite peripheral zones on an axis Y—Y passing a center of this sheet 13 with V-shaped recesses 14, 14 each opened upward at an obtuse angle. These recesses 14, 14 are adapted to receive said projections 12, 12, respectively, so that the upper sheet 13 can rock around said axis Y—Y relatively to the intermediate plate 10. An angle by which the upper sheet 13 can rock relatively to the intermediate plate 10 is limited by rubber stoppers 15 formed integrally with insulators 19 on upper surface of the upper sheet 13 at its peripheral zones which are diametrically opposite on an axis being orthogonal to said axis Y—Y. Specifically, these rubber stoppers 15 are adapted to come in contact with the intermediate plate 10 and thereby to limit the angle by which the upper sheet 13 can rock around the axis Y—Y relatively to the intermediate plate 10.

According to the embodiment as has been described above, the intermediate plate 10 is able to rock around the axis X—X relatively to the base plate 7 and the upper sheet 13 is able to rock around the axis Y—Y relatively to the intermediate plate 10. Thus, the upper sheet 13 is able to rock relatively to the absorber rod 3 in any direction.

Advantageous effect offered by such construction will be discussed. Relative approach of the car body and the wheels causes the absorber rod 3 to retract into the absorber tube 2 and the compression coil spring 17 is correspondingly compressed so as to generate a side force. The upper sheet 13 tilts in the direction of said side force and absorbs this side force. It thereby effectively avoids or prevents the absorber rod 3 and the absorber tube 2 being jammed together. In this way, the shock absorber 1 can smoothly expand and contract.

Figure 6:
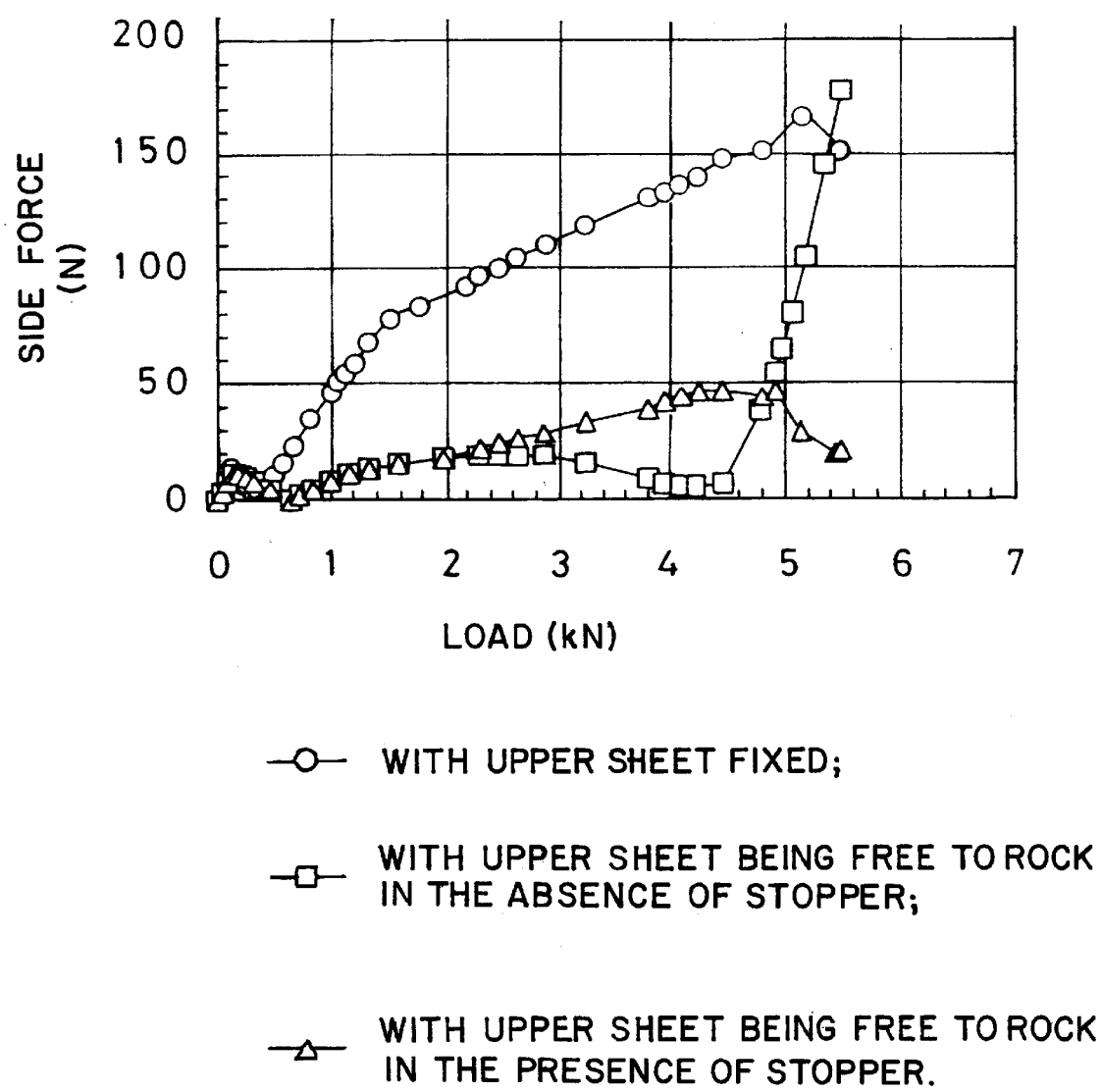
FIG. 6 is a graphic diagram plotting characteristics exhibited by the first embodiment.

With respect to a case in which the upper sheet is fixed as it has usually been in the prior art and a case in which the upper sheet is made free to rock in any direction as it is adopted by the above-described embodiment, the compression coil spring of the following specifications as indicated below has been analyzed by the inventor according to the finite element method. The analytical research has been conducted in the presence of the stopper and in the absence of the stopper. Result of the analysis indicated, as seen in FIG. 6, a fact that the side force is minimized when the upper sheet is free to rock and, even under a large load, the presence of the stopper is effective to prevent the side force from abruptly increasing.

SPECIFICATIONS:

Diameter of coil wire: 12.9 mm

Diameter of coil: 134 mm

Total number of turns: 5.38

Free height: 410.5 mm

Installation height: 205.0 mm

Maximum angle of rocking: 2.86°

Figure 3:
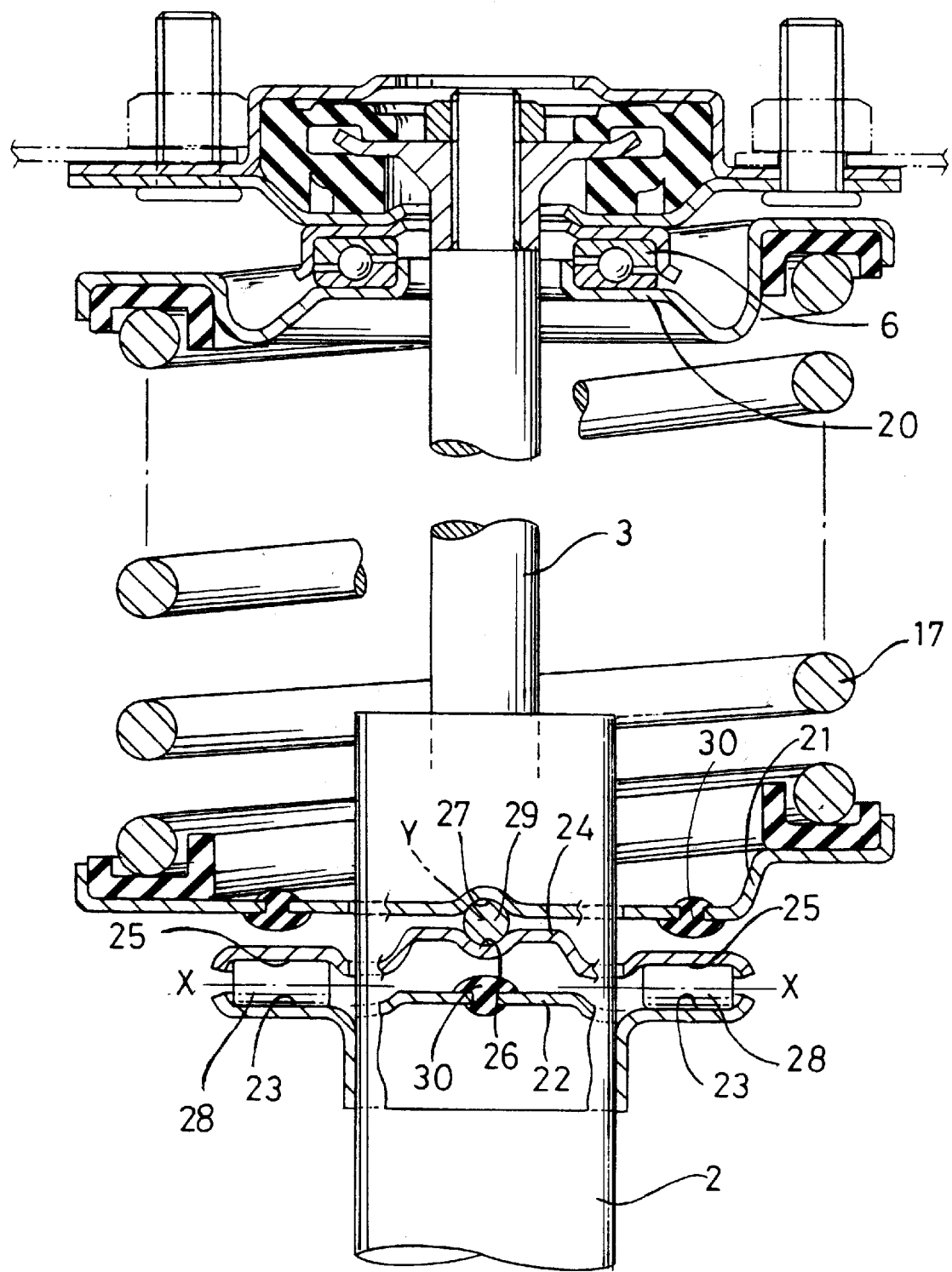
FIG. 3 is a view similar to FIG. 1, showing a second embodiment of the invention.
Figure 4:
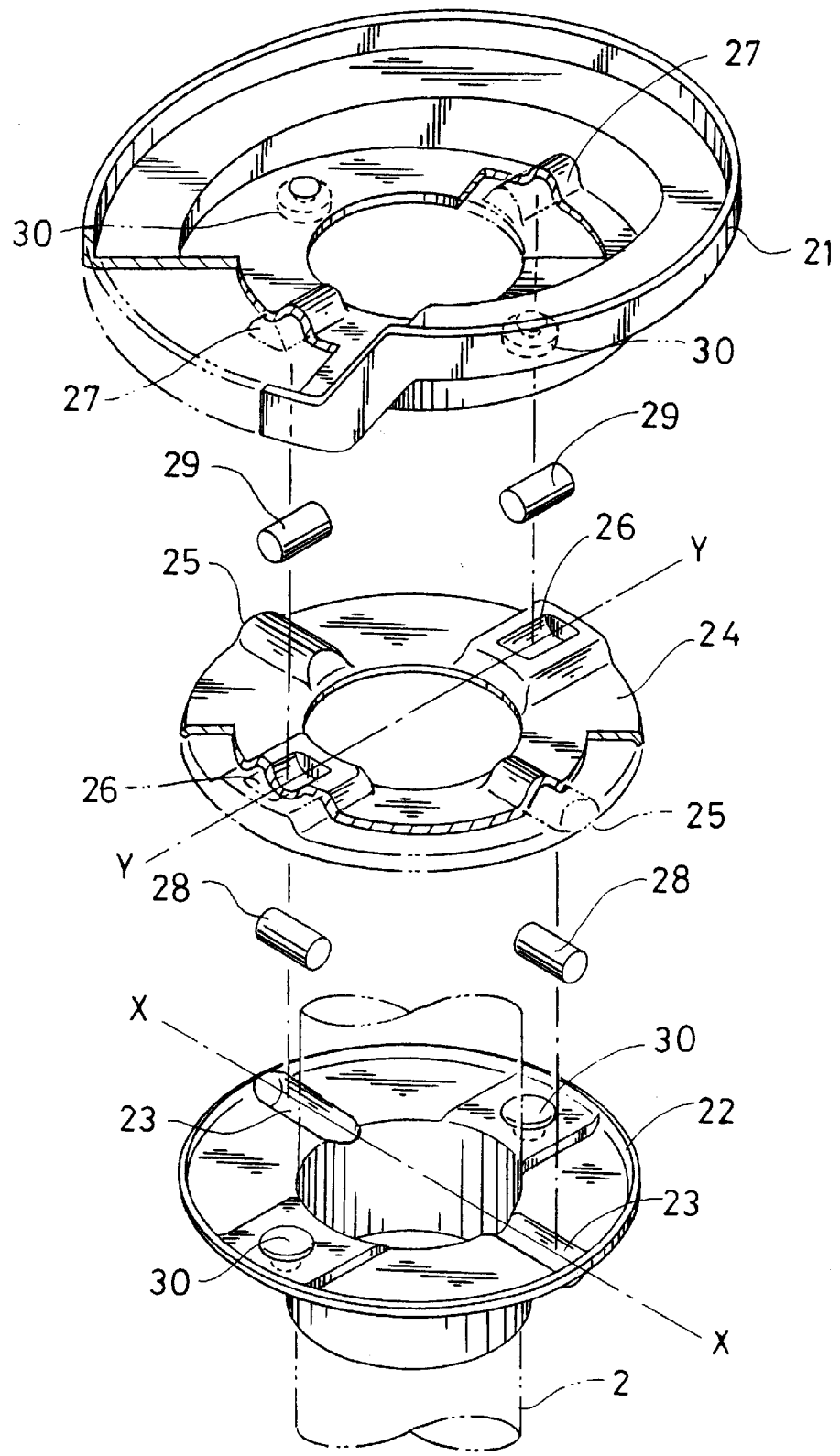
FIG. 4 is a view similar to FIG. 2, showing important parts of the second embodiment.

According to the second embodiment of the invention as shown in FIGS. 3 and 4, an upper sheet 20 and a lower sheet 21 are initially positioned at angles corresponding to lead angles of upper and lower spring seats of a compression coil spring 17. The upper sheet 20 is rotatably mounted on the absorber rod 3 with interposition of the thrust bearing 6.

A base plate 22 is fixed to the absorber tube 2 and is formed with a pair of upwardly opened recesses 23, 23 diametrically opposed to each other on an axis X—X passing a center of this base plate 22. An intermediate plate 24 overlying said base plate 22 is formed with a pair of downwardly opened recesses 25, 25 cooperating with said upwardly opened recesses 23, 23 formed by an intermediate plate 24, respectively, so an to hold rollers 28, 28 therebetween. By this arrangement, the intermediate plate 24 is able to rock around the axis X—X. The intermediate plate 24 is additionally formed on its upper surface with a pair of upwardly opened recesses 26, 26 diametrically opposed to each other on an axis Y—Y which is orthogonal to said axis X—X. A lower sheet 21 overlying said intermediate plate 24 is formed on its lower surface see with a pair of downwardly opened recesses 27, 27 diametrically opposed to each other on an axis Y—Y cooperating with said upwardly opened recesses 26, 26 formed by the intermediate plate 24, respectively, so as to hold rollers 29, 29 therebetween. By this arrangement, the lower sheet 21 is able to rock around the axis Y—Y relatively to the intermediate plate 24 and, therefore, able to rock in any direction relatively to the base plate 22 fixed to the absorber tube 2.

Similarly to the first embodiment, even when a side force is generated as a compressive load which is applied to the compression coil spring 17, such side force is absorbed by the lower sheet 21 rocking in the direction of such side force and there occurs no apprehension that the absorber tube 2 and the absorber rod 3 might be jammed together.

It should be understood that the base plate 22 and the lower sheet 21 are provided with respective pairs of rubber stoppers 30, wherein the stoppers provided on the bass plate 22 are diametrically opposed to each other on the axis which is orthogonal to the axis on which the stoppers provided on the lower sheet 21 are diametrically opposed to each other.

Figure 5:
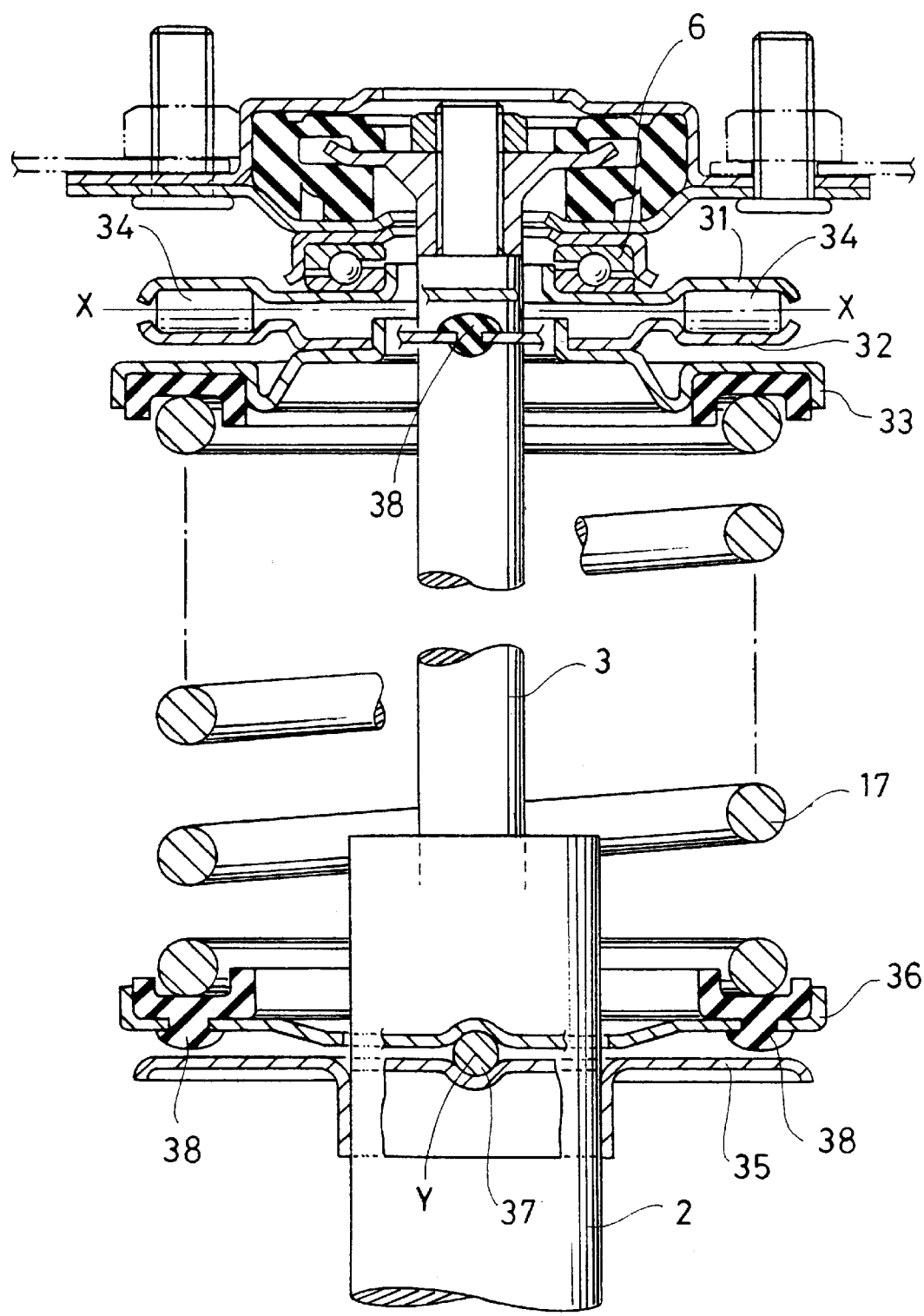
FIG. 5 is a view similar to FIG. 1,, showing at third embodiment of the invention.

According to the third embodiment of the invention as shown in FIG. 5, rollers 34, 34 spaced from each other on an axis X—X are held between a base plate 31 rotatably supported around the absorber rod 3 with interposition of the thrust bearing 6 and a support plate 32 which is integral with an upper sheet 33 in the same manner as in the previously described second embodiment. Similarly, rollers 37, 37 spaced from each other on an axis Y—Y are held between a base plate 35 fixed to the absorber tube 2 and a lower sheet 36. With a consequence, rocking of the upper sheet 33 around the axis X—X is combined with rocking of the lower sheet 36 around the axis Y—Y, allowing these upper and lower sheets 33 and 36 to rock in any direction so that a side force generated by the compression coil spring 17 may be effectively absorbed by the shock absorber.

The third embodiment is similar to the second embodiment in that the angles by which the upper sheet 33 and the lower sheet 36 can rock are limited by stoppers 38 provided on the support plate 32 and the lower sheet 36.

In the second and third embodiments, the rollers 28, 29, 34, 37 may be replaced by balls.

According to all the embodiments as have been described above, the upper and lower sheets are made free to rock relatively to each other in any direction by the arrangement such that these sheets are free to rock relatively to each other around the respective axes which are orthogonal to each other. However, it is also possible to determine the direction of the side force applied to the compression coil spring by an appropriate experiment or analytical research according to the finite element method so that the upper and lower sheets may be free to rock relatively to each other only in the direction thus determined. Such alternative arrangement will advantageously simplify the structure according to the previous embodiments without deterioration of the desired effect because said relative rocking of those sheets can be achieved around a single axis.

What is claimed is:

1. A suspension system for a vehicle comprising a compression coil spring and a shock absorber, said suspension system being characterized by upper and lower sheets mounted on an absorber rod and on an absorber tube so as to be loaded with said compression coil spring disposed therebetween, and both of said sheets in use being free to rock relative to each other in a predetermined direction so that side forces are alleviated by the rocking movement of said sheets, and said shock absorber smoothly expands and contracts without jamming.

2. The suspension system for a vehicle according to claim 1, wherein any one of said upper sheet and said lower sheet is adapted for relatively rocking around one axis.

3. The suspension system for a vehicle according to claim 1, wherein said upper sheet and said lower sheet are adapted for relatively rocking around two axes which are orthogonal to each other.

4. The suspension system for a vehicle according to claim 2 or 3, wherein said one axis is defined by a plurality of substantially V-sectioned recesses and substantially V-sectioned projections received by said recesses, respectively.

5. The suspension system for a vehicle according to claim 2 or 3, wherein said one axis is substantially defined by either a plurality of roller(s) or a plurality of ball(s).

6. The suspension system for a vehicle according to claim 1, wherein rocking movement of said upper or lower sheet is effective to alleviate a lateral force that is generated between said upper and lower sheets.

* * * * *